(12) United States Patent
Yun et al.

(10) Patent No.: US 11,459,967 B2
(45) Date of Patent: Oct. 4, 2022

(54) PASSIVE SELECTIVE CATALYTIC REDUCTION (SCR) SYSTEM AND METHOD FOR LOW-TEMPERATURE COMBUSTION (LTC) ENGINE

(71) Applicant: GM GLOBAL TECHNOLOGY OPERATIONS LLC, Detroit, MI (US)

(72) Inventors: Hanho Yun, Oakland Township, MI (US); Jun-mo Kang, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/176,277

(22) Filed: Feb. 16, 2021

(65) Prior Publication Data
US 2022/0260030 A1  Aug. 18, 2022

(51) Int. Cl.
| F02D 41/14 | (2006.01) |
| F02D 41/00 | (2006.01) |
| F02D 13/02 | (2006.01) |
| F02P 5/145 | (2006.01) |

(Continued)

(52) U.S. Cl.
CPC ..... F02D 41/1475 (2013.01); F02D 13/0261 (2013.01); F02D 41/0002 (2013.01); F02D 41/3035 (2013.01); F02D 41/403 (2013.01); F02P 5/145 (2013.01); F02D 2041/002 (2013.01); F02D 2200/0406 (2013.01); F02D 2200/08 (2013.01); F02D 2200/101 (2013.01)

(58) Field of Classification Search
CPC ............. F02D 41/1475; F02D 13/0261; F02D 41/0002; F02D 41/3035; F02D 41/403; F02D 2041/002; F02D 2200/0406; F02D 2200/08; F02D 2200/101; F02P 5/145
See application file for complete search history.

(56) References Cited

U.S. PATENT DOCUMENTS

| 8,616,182 | B2 * | 12/2013 | Wermuth | F02D 35/023 |
| | | | | 123/436 |
| 2009/0048760 | A1 * | 2/2009 | Chen | F02D 41/3035 |
| | | | | 701/103 |

(Continued)

OTHER PUBLICATIONS

"Lean Gasoline Emissions Control: NH$_3$ generation over commercial Three-Way Catalysts and Lean-NOx Traps". Todd J. Toops et al. U.S. Department of Energy; 2012 DEER Conference; Oct. 18, 2012; 29 pages.

*Primary Examiner* — Phutthiwat Wongwian
*Assistant Examiner* — Susan E Scharpf

(57) ABSTRACT

A combustion mode module is configured to switch operation of a low-temperature combustion (LTC) engine between a spark ignition (SI) mode, a positive valve overlap (PVO) mode, and a negative valve overlap (NVO) mode. A spark control module is configured to control a spark plug to generate a spark in a cylinder of the LTC engine when the LTC engine is operating in the SI mode. A valve control module is configured to control intake and exhaust valves of the cylinder to yield a PVO and a NVO when the LTC engine is operating in the PVO mode and the NVO mode, respectively. An air/fuel (A/F) control module is configured to adjust a desired A/F ratio of the LTC engine to a rich A/F ratio when operation of the LTC engine is switched to the PVO mode from either one of the SI mode and the NVO mode.

20 Claims, 8 Drawing Sheets

(51) Int. Cl.
*F02D 41/40* (2006.01)
*F02D 41/30* (2006.01)

(56) References Cited

U.S. PATENT DOCUMENTS

| | | | | |
|---|---|---|---|---|
| 2010/0107606 | A1* | 5/2010 | Narayanaswamy | F01N 13/0093 60/274 |
| 2010/0186390 | A1* | 7/2010 | Perry | F01N 3/2073 60/295 |
| 2010/0269771 | A1* | 10/2010 | Wermuth | F02D 13/0211 123/90.16 |
| 2011/0283971 | A1* | 11/2011 | Wermuth | F02P 5/045 123/406.11 |
| 2011/0283972 | A1* | 11/2011 | Wermuth | F02D 41/3035 123/406.12 |
| 2011/0288742 | A1* | 11/2011 | Wermuth | F02D 35/02 701/102 |
| 2011/0288750 | A1* | 11/2011 | Wermuth | F02D 41/3064 701/105 |
| 2013/0018565 | A1* | 1/2013 | Yun | F02D 41/3035 701/102 |
| 2013/0269317 | A1* | 10/2013 | Narayanaswamy | F02D 41/0082 60/274 |
| 2020/0032736 | A1* | 1/2020 | Masuda | F02D 41/1454 |

* cited by examiner

PASSIVE SELECTIVE CATALYTIC REDUCTION (SCR) SYSTEM AND METHOD FOR LOW-TEMPERATURE COMBUSTION (LTC) ENGINE

GOVERNMENT CLAUSE

This invention was made with government support under Grant No. DE-EE0007788 awarded by the U.S. Department of Energy. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to passive selective catalytic reduction (SCR) systems and methods for low-temperature combustion (LTC) engines.

Three-way and selective catalytic reduction (SCR) catalysts reduce emissions in exhaust from an engine. When an air/fuel ratio of the engine is rich or stoichiometric, the three-way catalyst reduces hydrocarbon, carbon monoxide, and nitrogen oxide and produces ammonia, and the SCR catalyst stores the ammonia. When the air/fuel ratio is lean, the three-way catalyst reduces hydrocarbon and carbon monoxide, and the ammonia stored in the SCR catalyst is used to reduce nitrogen oxide. Thus, the amount of ammonia stored in the SCR catalyst decreases when the air/fuel ratio is lean.

Typically, the air/fuel ratio is adjusted to lean to improve fuel economy. Passive SCR systems may switch the air/fuel ratio from lean to rich to increase ammonia storage levels in the SCR catalyst. Active SCR systems inject a dosing agent, such as urea, into exhaust to increase ammonia storage levels in the SCR catalyst. The dosing agent breaks down to form ammonia that is stored in the SCR catalyst.

SUMMARY

An example of a system according to the present disclosure includes a combustion mode module, a spark control module, a valve control module, and an air/fuel (A/F) ratio control module. The combustion mode module is configured to switch a combustion mode of a low-temperature combustion (LTC) engine between a spark ignition (SI) mode, a positive valve overlap (PVO) mode, and a negative valve overlap (NVO) mode. The spark control module is configured to control a spark plug to generate a spark in a cylinder of the LTC engine when the LTC engine is operating in the SI mode. The valve control module is configured to control intake and exhaust valves of the cylinder to yield a positive valve overlap when the LTC engine is operating in the PVO mode. The valve control module is configured to control the intake and exhaust valves of the cylinder to yield a negative valve overlap when the LTC engine is operating in the NVO mode. The A/F ratio control module is configured to adjust a desired A/F ratio of the LTC engine to a rich A/F ratio when the combustion mode of the LTC engine is switched to the PVO mode from either one of the SI mode and the NVO mode.

In one aspect, the A/F ratio control module is configured to adjust the desired A/F ratio of the LTC engine from the rich A/F ratio to a lean A/F ratio when the LTC engine is operating in the PVO mode and the desired A/F ratio of the LTC engine has been adjusted to the rich A/F ratio for a first period.

In one aspect, the A/F ratio control module is configured to determine the first period based on a storage level of ammonia in a selective catalytic reduction (SCR) catalyst in an exhaust system of the LTC engine.

In one aspect, the A/F ratio control module is configured to adjust the desired A/F ratio of the LTC engine from the lean A/F ratio to the rich A/F ratio when the LTC engine is operating in the PVO mode and a period that has elapsed since the desired A/F ratio of the LTC engine was last switched to the rich A/F ratio is greater than an inverse of a first frequency.

In one aspect, the A/F ratio control module is configured to determine the first frequency based on a storage level of ammonia in an SCR catalyst in an exhaust system of the LTC engine.

In one aspect, the combustion mode module is configured to switch the combustion mode of the LTC engine between the SI mode, the PVO mode, and the NVO mode based on a speed of the LTC engine and a load on the LTC engine.

In one aspect, the A/F ratio control module is configured to adjust the desired A/F ratio of the LTC engine to a stoichiometric A/F ratio when the LTC engine is operating in the SI mode.

In one aspect, when the LTC engine is operating in the PVO mode or the NVO mode, the LTC engine is configured to combust an A/F mixture within the cylinder using at least one of homogeneous charge compression ignition, premixed charge compression ignition, and reactivity controlled compression ignition.

In one aspect, the system further includes a desired manifold absolute pressure (MAP) module and a throttle control module. The desired MAP module is configured to determine a first desired MAP when the LTC engine is operating in the PVO mode and the desired A/F ratio of the LTC engine is adjusted to the rich A/F ratio. The throttle control module is configured to decrease an opening area of a throttle valve of the LTC engine when the LTC engine is operating in the PVO mode, the desired A/F ratio of the LTC engine is adjusted to the rich A/F ratio, and an actual MAP of the LTC engine is greater than the first desired MAP.

In one aspect, the throttle control module is configured to stop decreasing the opening area of the throttle valve when the actual MAP of the LTC engine is less than or equal to the first desired MAP.

In one aspect, the desired MAP module is configured to determine the first desired MAP based on a speed of the LTC engine and a load on the LTC engine.

In one aspect, the valve control module is configured to determine a desired mass of burned gas in the cylinder based on the actual MAP when the LTC engine is operating in the PVO mode and the desired A/F ratio of the LTC engine is adjusted to the rich A/F ratio, and control the intake and exhaust valves of the cylinder to decrease an amount of the positive valve overlap in order to decrease an actual mass of burned gas in the cylinder to the desired mass of burned gas in the cylinder.

In one aspect, the system further includes a fuel control module configured to adjust a fuel injection timing of the cylinder and a fuel split ratio of the cylinder based on the actual MAP of the LTC engine when the LTC engine is operating in the PVO mode and the desired A/F ratio of the LTC engine is adjusted to the rich A/F ratio. The fuel split ratio is a ratio between a mass of a pilot fuel injection during an engine cycle and a total mass of all fuel injections during the engine cycle.

In one aspect, the spark control module is configured to adjust a spark timing of the cylinder based on the actual MAP of the LTC engine when the LTC engine is operating in the PVO mode and the desired A/F ratio of the LTC engine is adjusted to the rich A/F ratio.

In one aspect, the throttle control module is configured to increase the opening area of the throttle valve when the LTC engine is operating in the PVO mode, the desired A/F ratio of the LTC engine is adjusted to a lean A/F ratio, and the actual MAP of the LTC engine is less than a second desired MAP.

In one aspect, the throttle control module is configured to stop increasing the opening area of the throttle valve when the actual MAP of the LTC engine is greater than or equal to the second desired MAP.

In one aspect, the valve control module is configured to determine a desired mass of burned gas in the cylinder based on the actual MAP when the LTC engine is operating in the PVO mode and the desired A/F ratio of the LTC engine is adjusted to the lean A/F ratio, and control the intake and exhaust valves of the cylinder to increase an amount of the positive valve overlap in order to increase an actual mass of burned gas in the cylinder to the desired mass of burned gas in the cylinder.

Another example of a system according to the present disclosure includes a combustion mode module, a spark control module, a valve control module, and an air/fuel (A/F) ratio control module. The combustion mode module is configured to switch a combustion mode of a low-temperature combustion (LTC) engine between a spark ignition (SI) mode, a positive valve overlap (PVO) mode, and a negative valve overlap (NVO) mode. The spark control module is configured to control a spark plug to generate a spark in a cylinder of the LTC engine when the LTC engine is operating in the SI mode. The valve control module is configured to control intake and exhaust valves of the cylinder to yield a positive valve overlap when the LTC engine is operating in the PVO mode, and control the intake and exhaust valves of the cylinder to yield a negative valve overlap when the LTC engine is operating in the NVO mode. The A/F ratio control module is configured to adjust a desired A/F ratio of the LTC engine to a stoichiometric A/F ratio when the LTC engine is operating in the SI mode, adjust the desired A/F ratio of the LTC engine to a lean A/F ratio when the LTC engine is operating in the NVO mode, and adjust the desired A/F ratio of the LTC engine to a rich A/F ratio when the LTC engine is operating in the PVO mode.

In one aspect, the A/F ratio control module is configured to adjust the desired A/F ratio to the rich A/F ratio when the combustion mode of the LTC engine is switched to the PVO mode from either one of the SI mode and the NVO mode.

In one aspect, the A/F ratio control module is configured to adjust the desired A/F ratio of the LTC engine from the rich A/F ratio to the lean A/F ratio when the LTC engine is operating in the PVO mode and the desired A/F ratio of the LTC engine has been adjusted to the rich A/F ratio for a threshold period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Active SCR systems are typically used with low-temperature combustion (LTC) engines to reduce nitrogen oxide emissions in exhaust gas produced by the LTC engines. An LTC engine is configured to operate in one or more of the following modes: spark ignition (SI) mode, homogeneous charge compression ignition (HCCI) mode, premixed charge compression ignition (PCCI) mode, and reactivity controlled compression ignition (RCCI) mode. When an LTC engine operates in any of the above compression ignition (CI)

modes, the valve timing of the LTC engine is typically adjusted to yield a positive valve overlap or a negative valve overlap.

As discussed above, a passive SCR system adjusts the A/F ratio of an engine to a rich A/F ratio to accumulate ammonia in an SCR catalyst that is used to reduce nitrogen oxide when the A/F ratio of the engine is adjusted to a lean A/F ratio. Adjusting the A/F ratio of an LTC engine to a rich A/F ratio while the valve timing of the LTC engine is adjusted to yield negative valve overlap may cause high combustion noise and/or unstable combustion. Adjusting the A/F ratio of an LTC engine to a rich A/F ratio while the valve timing of the LTC engine is adjusted to yield positive valve overlap may increase carbon monoxide emissions to undesired levels.

A passive SCR system according to the present disclosure only adjusts the A/F ratio of an LTC engine to a rich A/F ratio while the valve timing of the LTC engine is adjusted to yield a positive valve overlap. This avoids the combustion issues associated with adjusting the A/F ratio of an LTC engine to a rich A/F ratio while the valve timing of the LTC engine is adjusted to yield a negative valve overlap. The passive SCR system also minimizes the periods during which the LTC engine operates at a rich A/F ratio, which minimizes carbon monoxide emissions discharged by the LTC engine and improves the fuel efficiency of the LTC engine.

In addition, when the LTC engine operates at a rich A/F ratio, the passive SCR system gradually closes a throttle of the LTC engine to reduce the mass of air delivered to its cylinders during each engine cycle while maintaining its torque output at a requested level. This reduced air mass results in more residual gas in the cylinders, which may lead to instable combustion due to auto-ignition. To avoid this issue, the passive SCR system reduces the amount of positive valve overlap while the throttle is closing to reduce the induction of exhaust gas via exhaust valves. In addition, the passive SCR system adjusts spark and fuel injection timing to achieve spark-assisted combustion during transitions between rich and lean A/F ratios.

Figure 1:
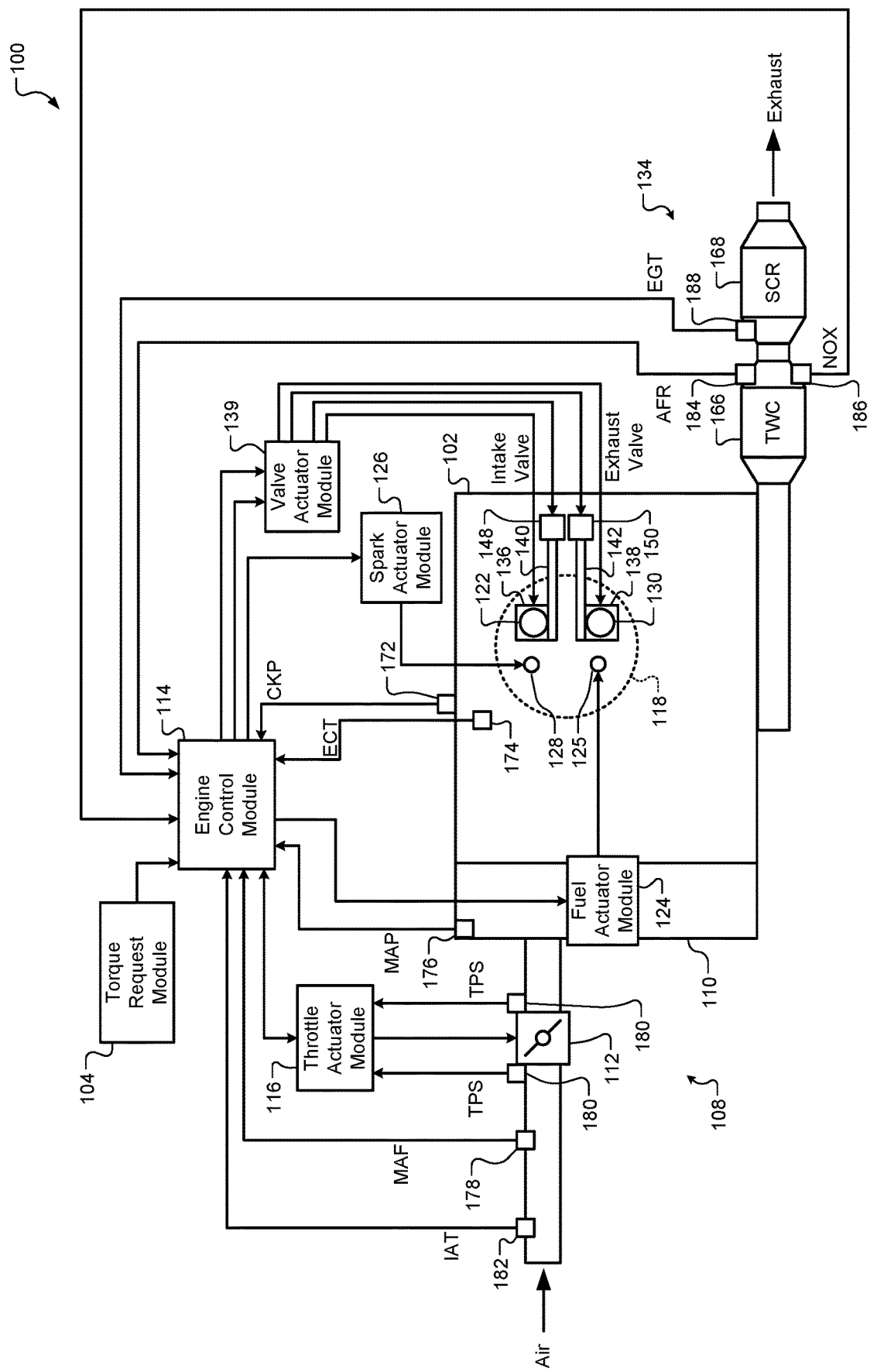
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver torque request (i.e., a driver-demanded torque) from a torque request module 104. The torque request module 104 may generate the driver torque request based on a position of an accelerator pedal and/or a speed setting of a cruise control system (not shown).

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, a single representative cylinder 118 is shown for illustration purposes. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke engine cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each cylinder. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 is a low-temperature combustion engine that combusts the air/fuel mixture in one or more of the following combustion modes: spark ignition (SI), homogeneous charge compression ignition (HCCI), premixed charge compression ignition (PCCI), and reactivity controlled compression ignition (RCCI). When the engine 102 is operating in the SI mode, a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC). When the engine 102 is operating in any of the compression ignition modes, compression in the cylinder 118 ignites the air/fuel mixture. The engine 102 may operate in a spark-assist mode in conjunction with any of the compression ignition modes. When the engine 102 is operating in the spark-assist mode, after combustion is initiated by compression in the cylinder 118, the spark actuator module 126 energizes the spark plug 128 to generate a spark in the cylinder 118 to ensure that the entire air/fuel mixture is combusted.

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 is actuated using an intake valve actuator 136, while the exhaust valve 130 is actuated using an exhaust valve actuator 138. A valve actuator module 139 may control the intake and exhaust valve actuators 136 and 138 based on signals from the ECM 114. In various implementations, the intake valve actuator 136 may actuate multiple intake valves (including the intake valve 122) of the cylinder 118. Similarly, the exhaust valve actuator 138 may actuate multiple exhaust valves (including the exhaust valve 130) of the cylinder 118. Additionally, a single valve actuator may actuate one or more exhaust valves of the cylinder 118 and one or more intake valves of the cylinder 118. Further, the intake valve actuator 136 may actuate multiple intake valves of multiple cylinders, and the exhaust valve actuator 138 may actuate multiple exhaust valves of multiple cylinders.

In various implementations, the intake valve actuator 136 may be driven by an intake camshaft 140, and the exhaust valve actuator 138 may be driven by an exhaust camshaft 142. For example, the intake valve actuator 136 may include a rocker arm and a cam follower coupled to the rocker arm. The rocker arm may lift the intake valve 122 from its valve seat when the cam follower engages a lobe on the intake camshaft 140. Similarly, the exhaust valve actuator 138 may include a rocker arm and a cam follower coupled to the rocker arm. The rocker arm may lift the exhaust valve 130 from its valve seat when the cam follower engages a lobe on the exhaust camshaft 142.

In other implementations, the intake and exhaust valve actuators 136 and 138 may actuate the intake and exhaust valves 122 and 130 independent of a camshaft. For example, the intake and exhaust valves 122 and 130 may be electromagnetic or electrohydraulic valve actuators. In these implementations, the intake and exhaust valve actuators 136 and 138 may be referred to as camless valve actuators.

The intake and exhaust valve actuators 136 and 138 may vary the amount by which the intake and exhaust valves 122 and 130 are lifted from their respective valve seats. For example, the intake and exhaust valve actuators 136 and 138 may switch between a first lift state and a second lift state. The intake and exhaust valve actuators 136 and 138 may cause the intake and exhaust valves 122 and 130 to lift from their respective valve seats by a first amount when operating in the first lift state. The intake and exhaust valve actuators 136 and 138 may cause the intake and exhaust valves 122 and 130 to lift from their respective valve seats by a second amount when operating in the second lift state. The first and second amounts may be predetermined, nonzero values. In addition, the second amount may be greater than the first amount. In this regard, the first lift state may be referred to as a low lift state, and the second lift state may be referred to as a high lift state.

When the intake and exhaust valve actuators 136 and 138 are cam driven, each of the intake and exhaust valve actuators 136 and 138 may include a cam follower having a height that is adjustable to vary the lift of the intake and exhaust valves 122 and 130. Alternatively, each of the intake and exhaust valve actuators 136 and 138 may include a solenoid that translates a camshaft segment along the length of one of the camshafts 140 and 142 to cause a cam follower to engage different lobes on the camshaft segment. The lobes may have different heights so that switching which one of the lobes the cam follower engages varies the lift of the intake and exhaust valves 122 and 130. Valve actuators such as these may be referred to as sliding cam actuators.

When the intake and exhaust valve actuators 136 and 138 are camless valve actuators, the valve actuators 136 and 138 may also adjust the timing of the intake and exhaust valves 122 and 130, respectively. When the intake and exhaust valve actuators 136 and 138 are cam driven, the timing of the intake and exhaust valves 122 and 130 may be adjusted by intake and exhaust cam phasers 148, 150, respectively. The valve actuator module 139 may adjust the position of the intake and exhaust cam phasers 148, 150 based on signals received from the ECM 114.

When the engine 102 operates in a positive valve overlap (PVO) mode, the valve actuators 136 and 138 adjust the timing of the intake and exhaust valves 122 and 130 to yield a positive valve overlap. A positive valve overlap occurs when the opening periods of the intake and exhaust valves 122 and 130 overlap one another. When the engine 102 operates in a negative valve overlap (NVO) mode, the valve actuators 136 and 138 adjust the timing of the intake and exhaust valves 122 and 130 to yield a negative valve overlap. A negative valve overlap occurs when the opening periods of the intake and exhaust valves 122 and 130 do not overlap.

The ECM 114 may deactivate the cylinder 118 by instructing the valve actuator module 139 to disable opening of the intake and exhaust valves 122 and 130. When the intake valve actuator 136 is cam driven, the intake valve actuator 136 may disable opening of the intake valve 122 by decoupling the intake valve 122 from the intake camshaft 140. Similarly, when the exhaust valve actuator 138 is cam driven, the exhaust valve actuator 138 may disable opening of the exhaust valve 130 by decoupling the exhaust valve 130 from the exhaust camshaft 142.

In various implementations, the valve actuator module 139 may disable opening of the intake and exhaust valves 122 and 130 by switching the intake and exhaust valve actuators 136 and 138 to a third lift state. The intake and exhaust valve actuators 136 and 138 may not lift the intake and exhaust valves 122 and 130 from their respective valve seats (i.e., the lift amount may be zero) when operating in the third lift state. Thus, the third lift state may be referred to as a zero lift state.

The exhaust system 134 includes a three-way catalyst 166 and a selective catalytic reduction (SCR) catalyst 168. When the air/fuel ratio of the engine 102 is rich or stoichiometric, the three-way catalyst 166 reduces hydrocarbon, carbon monoxide, and nitrogen oxide and produces ammonia, and the SCR catalyst 168 stores the ammonia. When the air/fuel ratio is lean, the three-way catalyst 166 reduces hydrocarbon and carbon monoxide, and the ammonia stored in the SCR catalyst 168 is used to reduce nitrogen oxide.

The position of the crankshaft may be measured using a crankshaft position (CKP) sensor 172. The temperature of the engine coolant may be measured using an engine coolant temperature (ECT) sensor 174. The ECT sensor 174 may be located within the engine 102 or at other locations where the coolant is circulated, such as a radiator (not shown).

The pressure within the intake manifold 110 may be measured using a manifold absolute pressure (MAP) sensor 176. In various implementations, engine vacuum, which is the difference between ambient air pressure and the pressure within the intake manifold 110, may be measured. The mass flow rate of air flowing into the intake manifold 110 may be measured using a mass air flow (MAF) sensor 178. In various implementations, the MAF sensor 178 may be located in a housing that also includes the throttle valve 112.

The throttle actuator module 116 may measure the position of the throttle valve 112 using one or more throttle position sensors (TPS) 180. The temperature of ambient air being drawn into the engine 102 may be measured using an intake air temperature (IAT) sensor 182. An air/fuel ratio of exhaust gas from the engine 102 may be measured using an air/fuel ratio (AFR) sensor 184. Nitrogen oxide and ammonia levels (or concentrations) in exhaust gas from the engine 102 may be measured using a nitrogen oxide (NOX) sensor 186. The AFR sensor 184 and the NOX sensor 186 may be positioned at or near the outlet of the three-way catalyst 166. The temperature of exhaust gas from the engine 102 may be measured using exhaust gas temperature (EGT) sensors 188. The EGT sensor 188 may be disposed at or near the inlet of the SCR catalyst 168.

The ECM 114 uses signals from the sensors to make control decisions for the engine system 100. In one example, the ECM 114 adjusts a desired A/F ratio of the engine 102 to a rich A/F ratio when the combustion mode of the engine 102 is switched to the PVO mode from either one of the NVO mode and the SI mode. The ECM 114 then adjusts the actual A/F ratio measured by the AFR sensor 184 to the desired A/F ratio by adjusting the position of the throttle valve 112 and/or the amount of fuel injected by the fuel injector 125 during each engine cycle.

After the engine 102 has been operating in the PVO mode for a certain period, the ECM 114 adjusts the desired A/F ratio of the engine 102 to a lean A/F ratio. Adjusting the A/F ratio of the engine 102 to a rich A/F ratio for a period when the combustion mode of the engine 102 is switched to the PVO mode reduces the amount of nitrogen oxide in exhaust gas exiting the exhaust system 134. Limiting the duration of that period reduces the amount of hydrocarbon in exhaust gas exiting the exhaust system 134 and increases the fuel efficiency of the engine 102.

Figure 2:
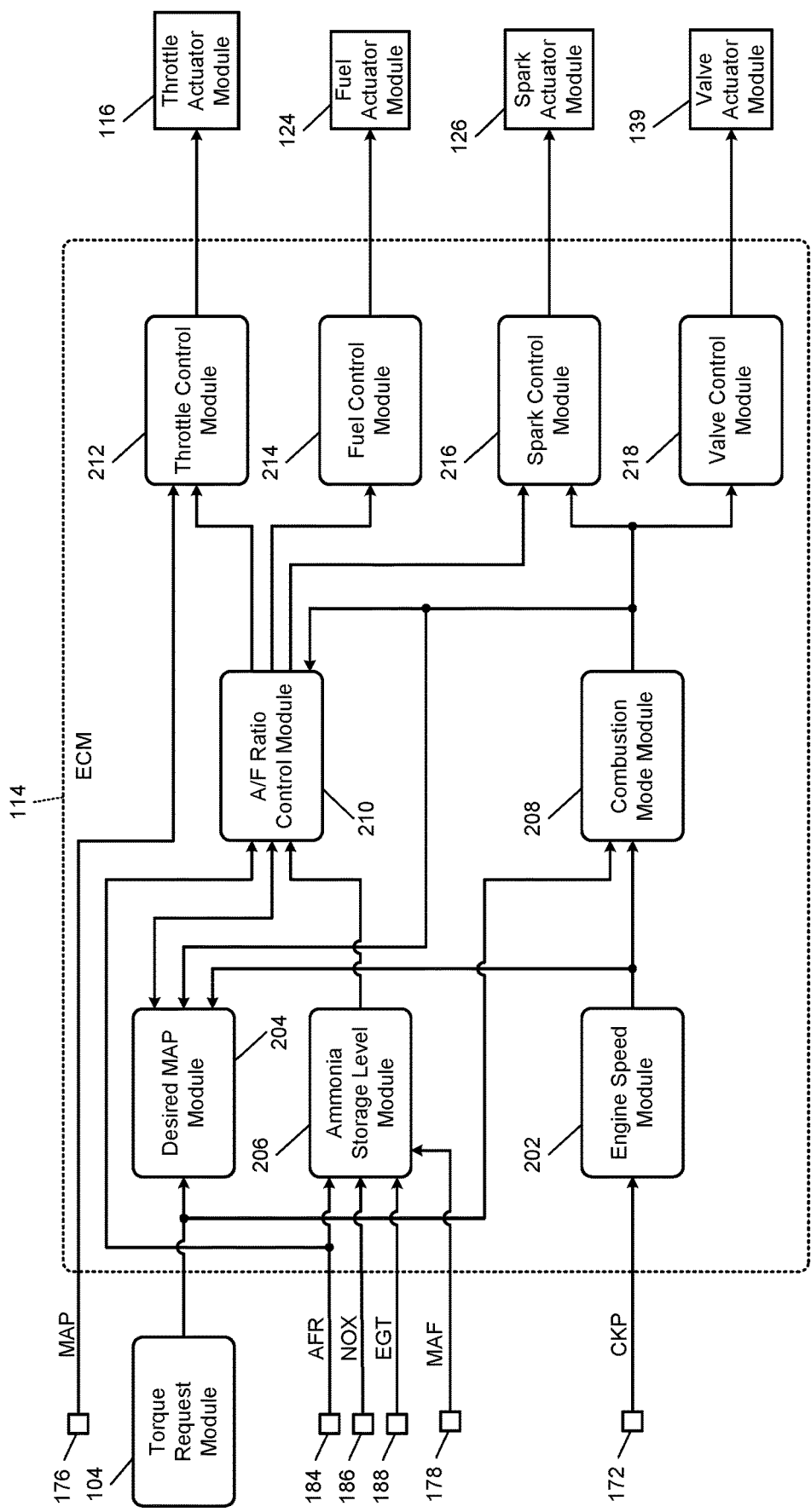
FIG. 2 is a functional block diagram of an example control system according to the principles of the present disclosure.

Referring now to FIG. 2, an example implementation of the ECM 114 includes an engine speed module 202, a desired MAP module 204, an ammonia storage level module 206, a combustion mode module 208, and an A/F ratio control module 210. The engine speed module 202 determines the speed of the engine 102 based on the crankshaft position from the CKP sensor 172. For example, the engine speed module 202 may calculate the engine speed based on a period that elapses as the crankshaft completes one or more revolutions. The engine speed module 202 outputs the engine speed.

The desired MAP module 204 determines a desired MAP of the engine 102. The desired MAP module 204 may set the desired MAP of the engine 102 to a predetermined value. Additionally or alternatively, the desired MAP module 204 may determine the desired MAP of the engine 102 based on one or more operating conditions of the engine 102 such as the speed of the engine 102 and/or the load on the engine 102. The engine load is equal to the driver torque request. The desired MAP module 204 outputs the desired MAP of the engine 102.

The ammonia storage level module 206 estimates a storage level of ammonia in the SCR catalyst 168. The ammonia storage level module 206 may estimate the ammonia storage level based on a mass flow rate of ammonia entering the SCR catalyst 168, a mass flow rate of nitrogen oxide entering the SCR catalyst 168, and a temperature of exhaust gas entering the SCR catalyst 168. For example, the ammonia storage level module 206 may estimate the ammonia storage level based on the ammonia flow rate, the nitrogen oxide flow rate, and the exhaust gas temperature using a mathematical model or a lookup table. The ammonia storage level module 206 receives the exhaust gas temperature from the EGT sensor 188. The ammonia storage level module 206 outputs the ammonia storage level.

The ammonia storage level module 206 may determine the ammonia flow rate based on the level of ammonia entering the SCR catalyst 168 and the mass flow rate of exhaust gas entering the SCR catalyst 168. For example, the ammonia storage level module 206 may determine a product of the ammonia level and the exhaust gas flow rate to obtain the ammonia flow rate. The ammonia storage level module 206 may determine the nitrogen oxide flow rate based on the level of nitrogen oxide entering the SCR catalyst 168 and the mass flow rate of exhaust gas entering the SCR catalyst 168. For example, the ammonia storage level module 206 may determine a product of the nitrogen oxide level and the exhaust gas flow rate to obtain the nitrogen oxide flow rate.

When the air/fuel ratio of the engine 102 is lean, the ammonia storage level module 206 may set the ammonia level to zero and determine the nitrogen oxide level based on an input from the NOX sensor 186. When the air/fuel ratio of the engine 102 is rich or stoichiometric, the ammonia storage level module 206 may set the nitrogen oxide level to zero and determine the ammonia level based on the input from the NOX sensor 186. The ammonia storage level module 206 receives the air/fuel ratio of the engine 102 from the AFR sensor 184. The ammonia storage level module 206 may use the mass flow rate of intake air from the MAF sensor 178 as an approximation of the exhaust gas flow rate.

The combustion mode module 208 switches the combustion mode of the engine 102 between the SI mode, the PVO mode, and the NVO mode. In one example, the combustion mode module 208 switches the combustion mode of the engine 102 between the SI mode, the PVO mode, and the NVO mode the engine speed and/or the engine load. The combustion mode module 208 may also adjust the combustion mode of the engine 102 to the HCCI mode, the PCCI mode, and the RCCI mode. The combustion mode module 208 may adjust the engine 102 to more than combustion mode. For example, the combustion mode module 208 may adjust the engine 102 to the PVO mode or the NVO mode and to the HCCI mode, the PCCI mode, or the RCCI mode. In turn, the engine 102 may operate in the PVO mode or the NVO mode while also operating in the HCCI mode, the PCCI mode, or the RCCI mode. The combustion mode module 208 outputs the combustion mode(s) of the engine 102.

The A/F ratio control module 210 controls the A/F ratio of the engine 102 (i.e., the A/F ratio of the air/fuel mixture combusted by the engine 102) by outputting a desired A/F ratio of the engine 102. The A/F ratio control module 210 may switch the desired A/F ratio between a rich A/F ratio (e.g., an A/F ratio between 9:1 and 13:1), a lean A/F ratio (e.g., an A/F ratio between 18:1 and 25:1), and a stoichiometric A/F ratio (e.g., an A/F ratio of 14.7:1). The A/F ratio control module 210 may adjust the desired A/F ratio of the engine 102 to the rich A/F ratio or the lean A/F ratio when the engine 102 is operating in the PVO mode. The A/F ratio control module 210 may adjust the desired A/F ratio of the engine 102 to the lean A/F ratio when the engine 102 is operating in the NVO mode. The A/F ratio control module 210 may adjust the desired A/F ratio of the engine 102 to the stoichiometric A/F ratio when the engine 102 is operating in the SI mode.

The example implementation of the ECM 114 shown in FIG. 2 further includes a throttle control module 212, a fuel control module 214, a spark control module 216, and a valve control module 218. The throttle control module 212 controls the position of the throttle valve 112. The throttle control module 212 outputs a desired position of the throttle valve 112, and the throttle actuator module 116 actuates the throttle valve 112 to decrease the difference between the actual position of the throttle valve 112 and the desired position. The throttle control module 212 may adjust the position of the throttle valve 112 based on the desired MAP. For example, the throttle control module 212 may adjust the position of the throttle valve 112 to reduce the difference between the actual MAP and the desired MAP. The throttle control module 212 may receive the actual MAP from the MAP sensor 176. The throttle control module 212 may receive the desired MAP from the desired MAP module 204 or the A/F ratio control module 210.

The fuel control module 214 controls the amount(s) of fuel injected by the fuel injectors of the engine 102 (including the fuel injector 125) during each engine cycle. In one example, the fuel control module 214 controls the total mass of all fuel injections for each cylinder during each engine cycle, as well as a fuel split ratio for each cylinder. The fuel split ratio is a ratio between a mass of a pilot fuel injection for a cylinder during an engine cycle and the total mass of all fuel injections for the cylinder during the engine cycle. The fuel control module 214 also controls the timing of the fuel injections. The timing of the fuel injections may be specified relative to the time when the piston is at its topmost position, referred to as top dead center (TDC).

The fuel control module 214 may control the total mass of all fuel injections for each cylinder during each engine cycle to achieve the desired A/F ratio (i.e., decrease the difference between the actual A/F ratio measured by the AFR sensor 184 and the desired A/F ratio). The fuel control module 214 may receive the actual A/F ratio from the AFR sensor 184 or the A/F ratio control module 210. The fuel control module 214 outputs a signal indicating the total mass of fuel injections for each cylinder during each engine cycle, the split ratio of each cylinder, and the fuel injection timing. In response, the fuel actuator module 124 actuates the fuel injectors of the engine 102 to achieve the total mass of fuel injections, the split ratio, and the fuel injection timing.

The spark control module 216 controls the spark plugs of the engine 102 (including the spark plug 128) to generate a spark in cylinders of the engine 102. The spark control module 216 outputs a signal indicating the spark timing for each cylinder of the engine 102, and the spark actuator module 126 actuates the spark plugs of the engine 102 to achieve the spark timing. When the engine 102 is operating in the SI mode, the spark control module 216 adjusts the spark timing so that combustion in the cylinders of the engine 102 is initiated by the spark. When the engine 102 is operating in the spark-assist mode, the spark control module 216 adjusts the spark timing so that spark is generated in a cylinder after combustion is initiated (or expected to be initiated) by compression within the cylinder.

The valve control module 218 controls the lift (opening amount), opening duration, and opening timing of the intake and exhaust valves of the engine 102 (including the intake and exhaust valves 122 and 130). The valve control module 218 outputs a signal indicating a desired lift, a desired opening duration, and a desired timing of each of the intake and exhaust valves of the engine 102. In response, the valve actuator module 139 controls the intake and exhaust valves to achieve the desired valve lift, the desired valve opening duration, and the desired valve timing. When the engine 102 operates in the PVO mode, the valve control module 218 adjusts the timing of the intake and exhaust valves of the engine 102 to yield a positive valve overlap. When the engine 102 operates in the NVO mode, the valve control module 218 adjusts the timing of the intake and exhaust valves of the engine 102 to yield a negative valve overlap.

Figure 3:
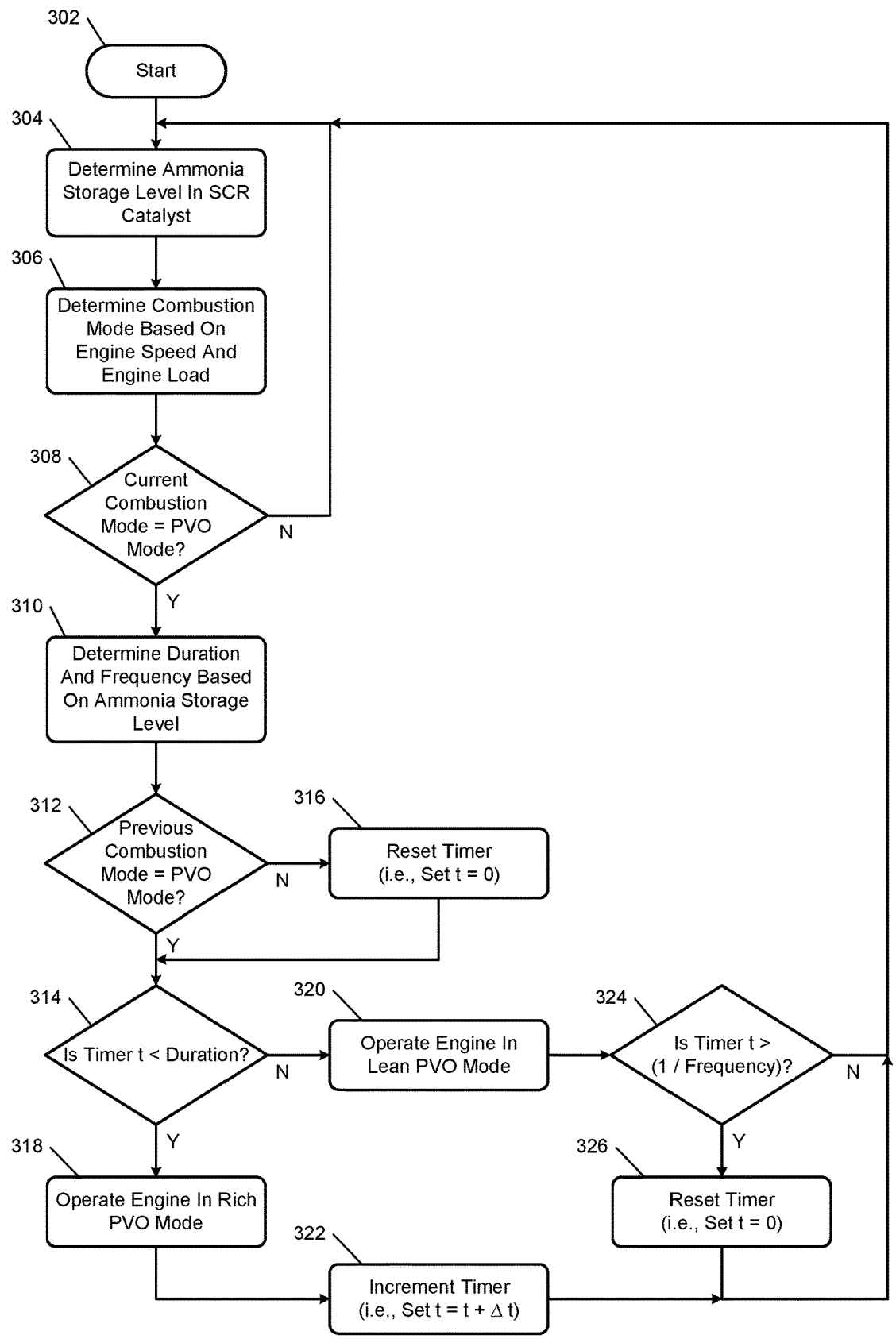
FIG. 3 is a flowchart illustrating an example method for optimizing the air/fuel (A/F) ratio of an engine according to the present disclosure when the engine is operating in a positive valve overlap (PVO) mode.

Referring now to FIG. 3, a method for optimizing the A/F ratio of the engine 102 when the engine 102 is operating in the PVO mode begins at 302 when the engine 102 is started. The below description of the method indicates that one of the modules of FIG. 2 performs each step of the method. However, the particular modules that perform the steps of the method may be different than the modules mentioned in the below description of the method. Additionally or alternatively, one or more steps of the method may be implemented apart from the modules of FIG. 2. At 304, the ammonia storage level module 206 determines the storage level of ammonia in the SCR catalyst 168.

At 306, the combustion mode module 208 determines the combustion mode(s) of the engine 102 based on the speed of the engine 102 and the load on the engine 102. The combustion mode module 208 may switch the combustion mode of the engine 102 between the SI mode, the PVO mode, and the NVO mode using a predetermined relationship between these modes and the engine speed and load. An example of such a predetermined relationship is embodied in FIG. 4.

Figure 5:
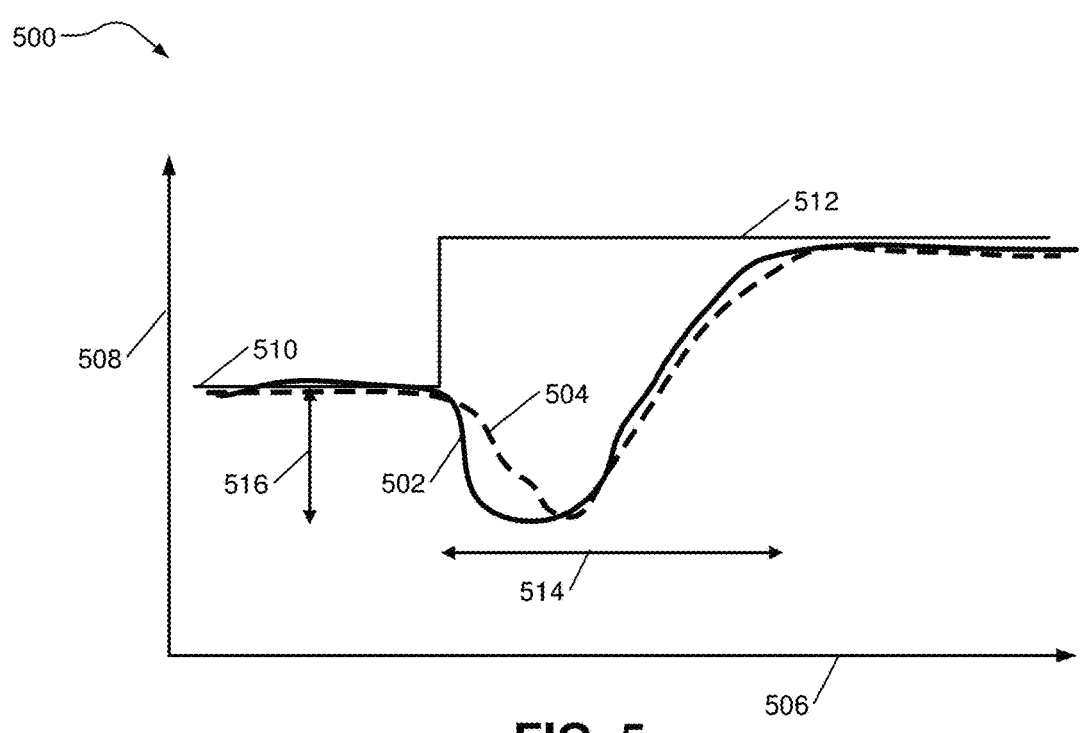
FIG. 5 is a graph illustrating example A/F ratios of an engine as the engine transitions from operating in the NVO mode to operating in the PVO mode according to the present disclosure.

At 308, the A/F ratio control module 210 determines whether the current combustion mode is the PVO mode. If the current combustion mode is the PVO mode, the method continues at 310. Otherwise, the method returns to 304. At 310, the A/F ratio control module 210 determines an enrichment duration and an enrichment frequency based on the ammonia storage level using, for example, a function or a lookup table. The enrichment duration is a duration of a period during which the desired A/F ratio of the engine 102 is adjusted to a rich A/F ratio. An example of the enrichment duration is illustrated in FIG. 5. The enrichment frequency indicates how often the desired A/F ratio of the engine is adjusted to a rich A/F ratio while the engine 102 is operating in the PVO mode.

At 312, the A/F ratio control module 210 determines whether the previous combustion mode was the PVO mode. If the previous combustion mode is one of the PVO modes, the method continues directly to 314. Otherwise, the method continues to 316 before continuing to 314. At 316, the A/F ratio control module 210 reset a timer t (i.e., sets the timer t to zero).

At 314, the A/F ratio control module 210 determines whether the timer t is less than the enrichment duration. If the timer t is less than the enrichment duration, the method continues at 318. Otherwise, the method continues at 320. At 318, the A/F ratio control module 210 operates the engine 102 in a rich PVO mode. In other words, the A/F ratio control module 210 adjusts the desired A/F ratio of the engine 102 to a rich A/F ratio while the engine 102 is operating in the PVO mode. At 322, the A/F ratio control module 210 increments the timer T (i.e. set the current value of the timer t equal to the previous value of the timer t plus a time increment $\Delta t$).

At 320, the A/F ratio control module 210 operates the engine 102 in a lean PVO mode. In other words, the A/F ratio control module 210 adjusts the desired A/F ratio of the engine 102 to a lean A/F ratio while the engine 102 is operating in the PVO mode. At 324, the A/F ratio control module 210 determines whether the timer t is greater than an inverse of the enrichment frequency. If the timer t is greater than the inverse of the enrichment frequency, the method continues at 326. Otherwise, the method returns to 304. At 326, the A/F ratio control module 210 reset the timer t. The method of FIG. 3 may be repeatedly performed while the engine 102 is running.

Figure 4:
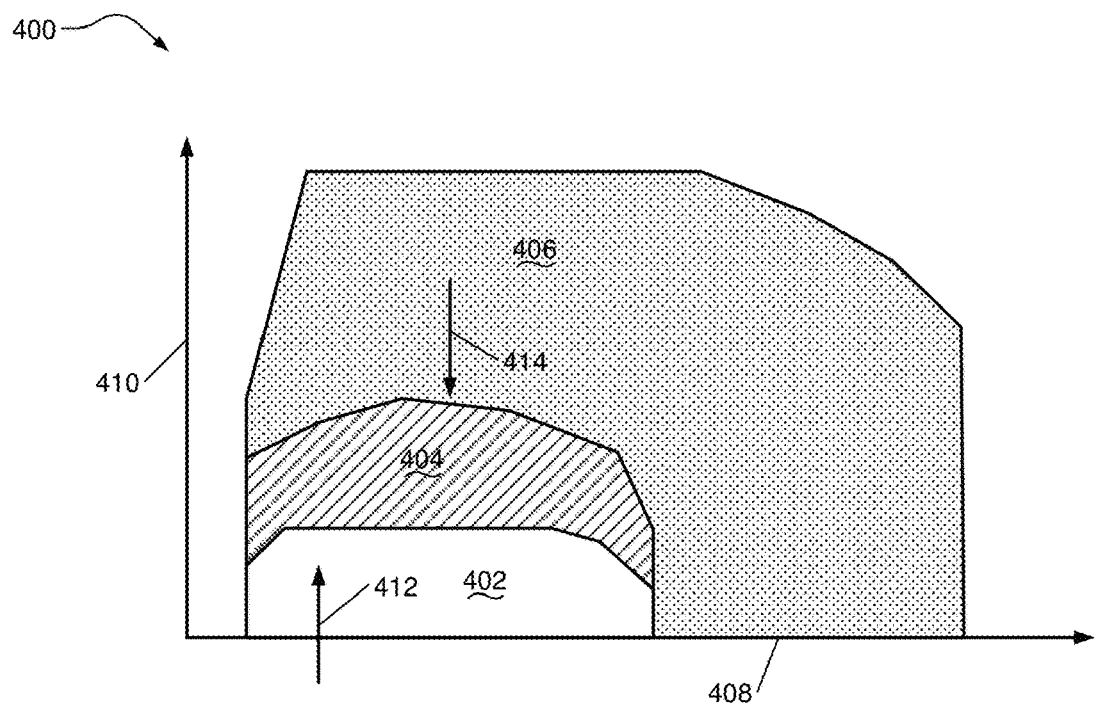
FIG. 4 is a graph illustrating an example relationship between engine operating conditions and the PVO mode, a negative valve overlap (NVO) mode, and a spark ignition (SI) mode according to the present disclosure.

Referring now to FIG. 4, a graph 400 illustrates an example of operating conditions of the engine 102 that correspond to the NVO mode, the PVO mode, and the SI mode. In the graph 400, an NVO mode operating range 402, a PVO mode operating range 404, and an SI mode operating range 406 are plotted with respect to an x-axis 408 and a y-axis 410. The x-axis 408 represents engine speed in revolution per minute (rpm). The y-axis 410 that represents engine load (or driver-demanded torque) in Newton-meters (Nm). In response to an accelerator pedal tip-in 412, the engine 102 transitions from the NVO mode operating range 402 to the PVO mode operating range 404. In response to an accelerator pedal tip-out 414, the engine 102 transitions from the SI mode operating range 406 to the PVO mode operating range 404.

Referring now to FIG. 5, a graph 500 illustrates examples of the A/F ratio of the engine 102 as the engine 102 transitions from operating in the NVO mode to operating in the PVO mode. In the graph 500, a first A/F signal 502 and a second A/F signal 504 are plotted with respect to an x-axis 506 that represents time and a y-axis 508 that represents A/F ratio. Each of the first and second A/F signal 502 and 504 indicate the A/F ratio of the engine 102 as the engine 102 transitions from operating at a first lean A/F ratio 510 in the NVO mode to a second lean A/F ratio 512 in the PVO mode. During the transition, the A/F ratio of the engine 102 is adjusted to a rich A/F ratio for an enrichment period having a duration 514 and a depth 516. The enrichment period starts when the A/F ratio of the engine 102 initially decreases from the first lean A/F ratio 510, and the enrichment period ends when the A/F ratio of the engine 102 initially reaches the second lean A/F ratio 512. The depth 516 of the enrichment period is the difference between the first lean A/F ratio 510 and the minimum A/F ratio of the engine 102 during the enrichment period.

Figure 6:
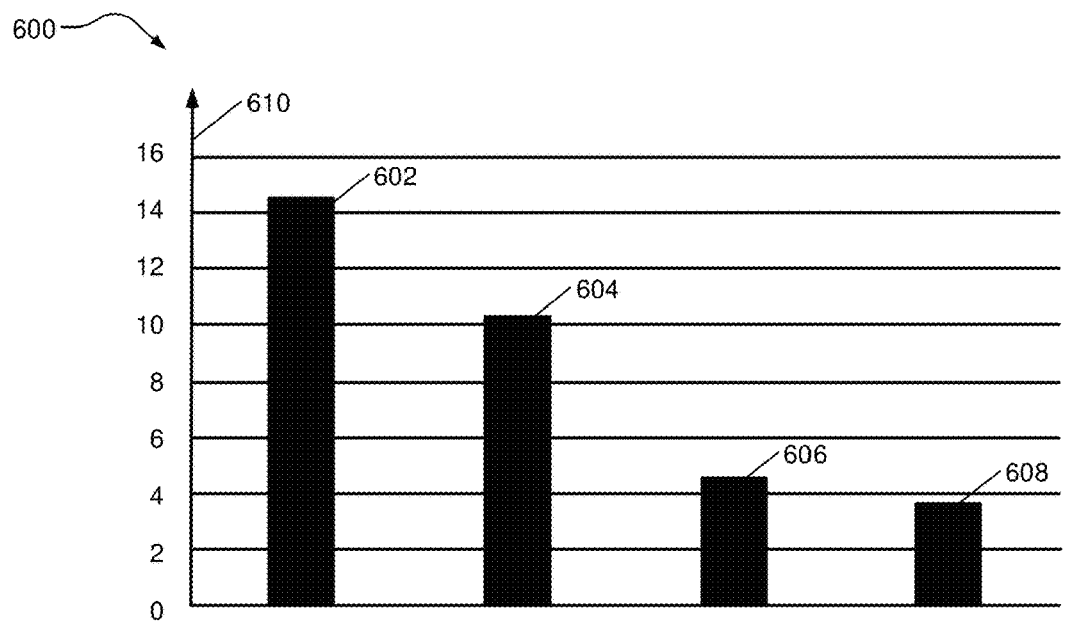
FIG. 6 is a graph illustrating example rates at which nitrogen oxide is discharged from an exhaust system of an engine when the engine is operating in the PVO mode according to the present disclosure.
Figure 7:
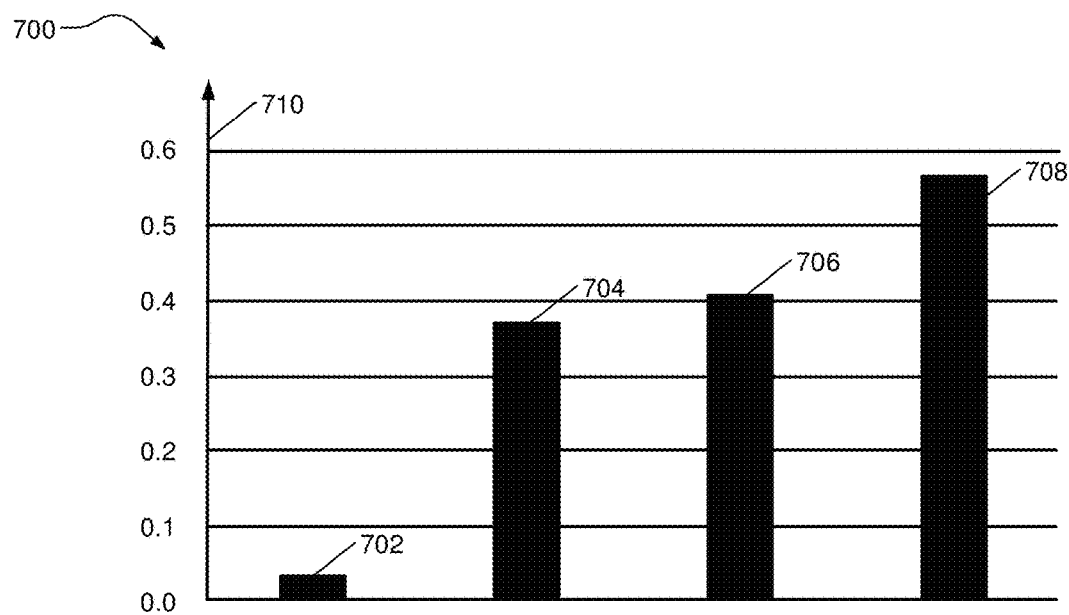
FIG. 7 is a graph illustrating example rates at which carbon monoxide is discharged from an exhaust system of an engine when the engine is operating in the PVO mode according to the present disclosure.

Referring now to FIGS. 6 and 7, graphs 600, 700 illustrate that selecting the duration and frequency of engine operation in the PVO rich mode involves a tradeoff between minimizing nitrogen oxide emissions and minimizing carbon monoxide emissions. The graph 600 of FIG. 6 illustrates rates at which nitrogen oxide is discharged from the exhaust system 34 when the engine 102 is operating in the PVO mode and the enrichment duration is varied while the enrichment frequency is held constant. In the graph 600, a first nitrogen oxide discharge rate 602, a second nitrogen oxide discharge rate 604, a third nitrogen oxide discharge rate 606, and a fourth nitrogen oxide discharge rate 608 are plotted with respect to a y-axis 610. The y-axis 610 indicates emissions discharge rate in milligrams per mile (mg/mi).

The first nitrogen oxide discharge rate 602 is the rate at which nitrogen oxide is discharged from the exhaust system 34 when the A/F ratio of the engine 102 is adjusted to a rich A/F ratio of 12:1 for 1 second and to a lean A/F ratio for 9 seconds. This sequence is repeated as long as the engine 102 is operating in the PVO mode. Thus, the first nitrogen oxide discharge rate 602 corresponds to an enrichment duration of 1 second and an enrichment frequency of 1/10 seconds or 0.1 Hertz (Hz).

The second nitrogen oxide discharge rate 604 is the rate at which nitrogen oxide is discharged from the exhaust system 34 when the A/F ratio of the engine 102 is adjusted to a rich A/F ratio of 12:1 for 2 seconds and to a lean A/F ratio for 8 seconds. This sequence is repeated as long as the engine 102 is operating in the PVO mode. Thus, the second nitrogen oxide discharge rate 604 corresponds to an enrichment duration of 2 seconds and an enrichment frequency of 0.1 Hz.

The third nitrogen oxide discharge rate 606 is the rate at which nitrogen oxide is discharged from the exhaust system 34 when the A/F ratio of the engine 102 is adjusted to a rich A/F ratio of 12:1 for 3 seconds and to a lean A/F ratio for 7 seconds. This sequence is repeated as long as the engine 102 is operating in the PVO mode. Thus, the third nitrogen oxide discharge rate 606 corresponds to an enrichment duration of 3 seconds and an enrichment frequency of 0.1 Hz.

The fourth nitrogen oxide discharge rate 608 is the rate at which nitrogen oxide is discharged from the exhaust system 34 when the A/F ratio of the engine 102 is adjusted to a rich A/F ratio of 12:1 for 5 seconds and to a lean A/F ratio for 5 seconds. This sequence is repeated as long as the engine 102 is operating in the PVO mode. Thus, the fourth nitrogen oxide discharge rate 608 corresponds to an enrichment duration of 5 seconds and an enrichment frequency of 0.1 Hz.

The graph 700 of FIG. 7 illustrates rates at which carbon monoxide is discharged from the exhaust system 34 when the engine 102 is operating in the PVO mode and the enrichment duration is varied while the enrichment frequency is held constant. In the graph 700, a first carbon monoxide discharge rate 702, a second carbon monoxide discharge rate 704, a third carbon monoxide discharge rate 706, and a fourth carbon monoxide discharge rate 708 are plotted with respect to a y-axis 710. The y-axis 710 indicates emissions discharge rate in grams per mile (g/mi).

The first carbon monoxide discharge rate 702 is the rate at which carbon monoxide is discharged from the exhaust system 34 when the A/F ratio of the engine 102 is adjusted to a rich A/F ratio of 12:1 for 1 second and to a lean A/F ratio for 9 seconds. This sequence is repeated as long as the engine 102 is operating in the PVO mode. Thus, the first carbon monoxide discharge rate 702 corresponds to an enrichment duration of 1 second and an enrichment frequency of 0.1 Hz.

The second carbon monoxide discharge rate 704 is the rate at which carbon monoxide is discharged from the exhaust system 34 when the A/F ratio of the engine 102 is adjusted to a rich A/F ratio of 12:1 for 2 seconds and to a lean A/F ratio for 8 seconds. This sequence is repeated as long as the engine 102 is operating in the PVO mode. Thus, the second carbon monoxide discharge rate 704 corresponds to an enrichment duration of 2 seconds and an enrichment frequency of 0.1 Hz.

The third carbon monoxide discharge rate 706 is the rate at which carbon monoxide is discharged from the exhaust system 34 when the A/F ratio of the engine 102 is adjusted to a rich A/F ratio of 12:1 for 3 seconds and to a lean A/F ratio for 7 seconds. This sequence is repeated as long as the engine 102 is operating in the PVO mode. Thus, the third carbon monoxide discharge rate 706 corresponds to an enrichment duration of 3 seconds and an enrichment frequency of 0.1 Hz.

The fourth carbon monoxide discharge rate 708 is the rate at which carbon monoxide is discharged from the exhaust system 34 when the A/F ratio of the engine 102 is adjusted to a rich A/F ratio of 12:1 for 5 seconds and to a lean A/F ratio for 5 seconds. This sequence is repeated as long as the engine 102 is operating in the PVO mode. Thus, the fourth carbon monoxide discharge rate 708 corresponds to an enrichment duration of 5 seconds and an enrichment frequency of 0.1 Hz.

In the graph 600 of FIG. 6, the rate at which nitrogen oxide is discharged from the exhaust system 34 decreases as the enrichment duration increases. In the graph 700 of FIG. 7, the rate at which carbon monoxide is discharged from the exhaust system 34 increases as the enrichment duration increases. In the method of FIG. 3, the enrichment duration may be minimized to minimize carbon monoxide emissions while maintaining nitrogen oxide emissions at an acceptable level.

Figure 8:
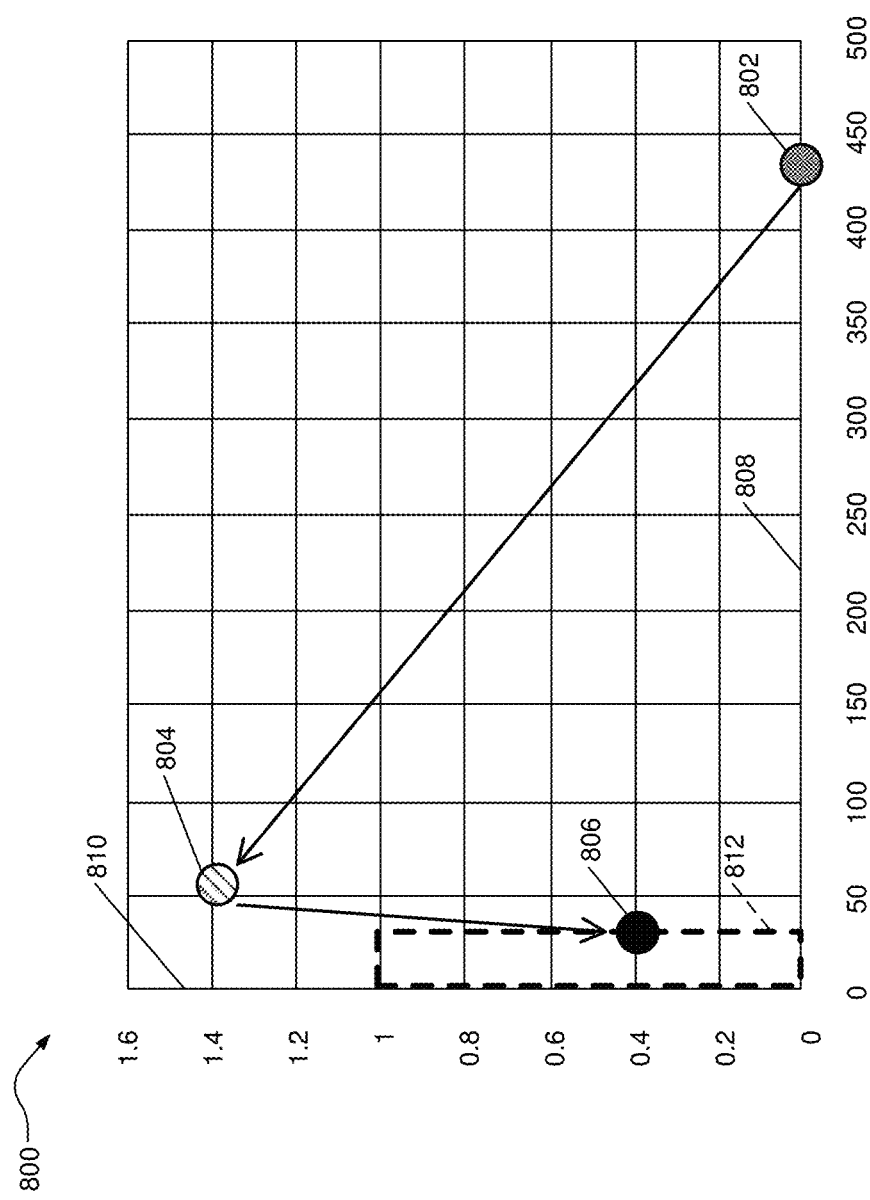
FIG. 8 is a graph illustrating example rates at which various emissions are discharged from an exhaust system of an engine when the engine is operating in the PVO mode according to the present disclosure.

Referring now to FIG. 8, a graph 800 illustrates the rates at which emissions are discharged from the exhaust system 34 when the engine 102 is operating in the PVO mode and the A/F ratio of the engine 102 is controlled using different methods. A first emissions discharge rate 802 results from a first A/F ratio control method, a second emissions discharge rate 804 results from a second A/F ratio control method, and a third emissions discharge rate 806 results from a third A/F ratio control method. The first, second, and third emissions discharge rates 802, 804, and 806 are plotted with respect to an x-axis 808 and a y-axis 810. The x-axis 808 represents the sum of the rates at which nitrogen oxide and hydrocarbon are discharged from the exhaust system 34 in mg/mi. The y-axis 810 represents the rate at which carbon monoxide is discharged from the exhaust system 34 in g/mi. A target range 812 for the nitrogen oxide, hydrocarbon, and carbon monoxide discharge rates is also plotted with respect to the x-axis 808 and the y-axis 810.

The first A/F ratio control method involves maintaining the A/F ratio of the engine 102 at a lean air/fuel ratio when the engine 102 is operating in the PVO mode. The second A/F ratio control method involves maintaining the A/F ratio of the engine 102 at a rich air/fuel ratio when the engine 102 is operating in the PVO mode. The third A/F ratio control method involves optimizing the A/F ratio of the engine 102 when the engine 102 is operating in the PVO mode by, for example, minimizing the enrichment duration. While the first and second emissions discharge rates 802 and 804 fall outside of the target range 812, the third emissions discharge rate 806 is within the target range 812.

Figure 9:
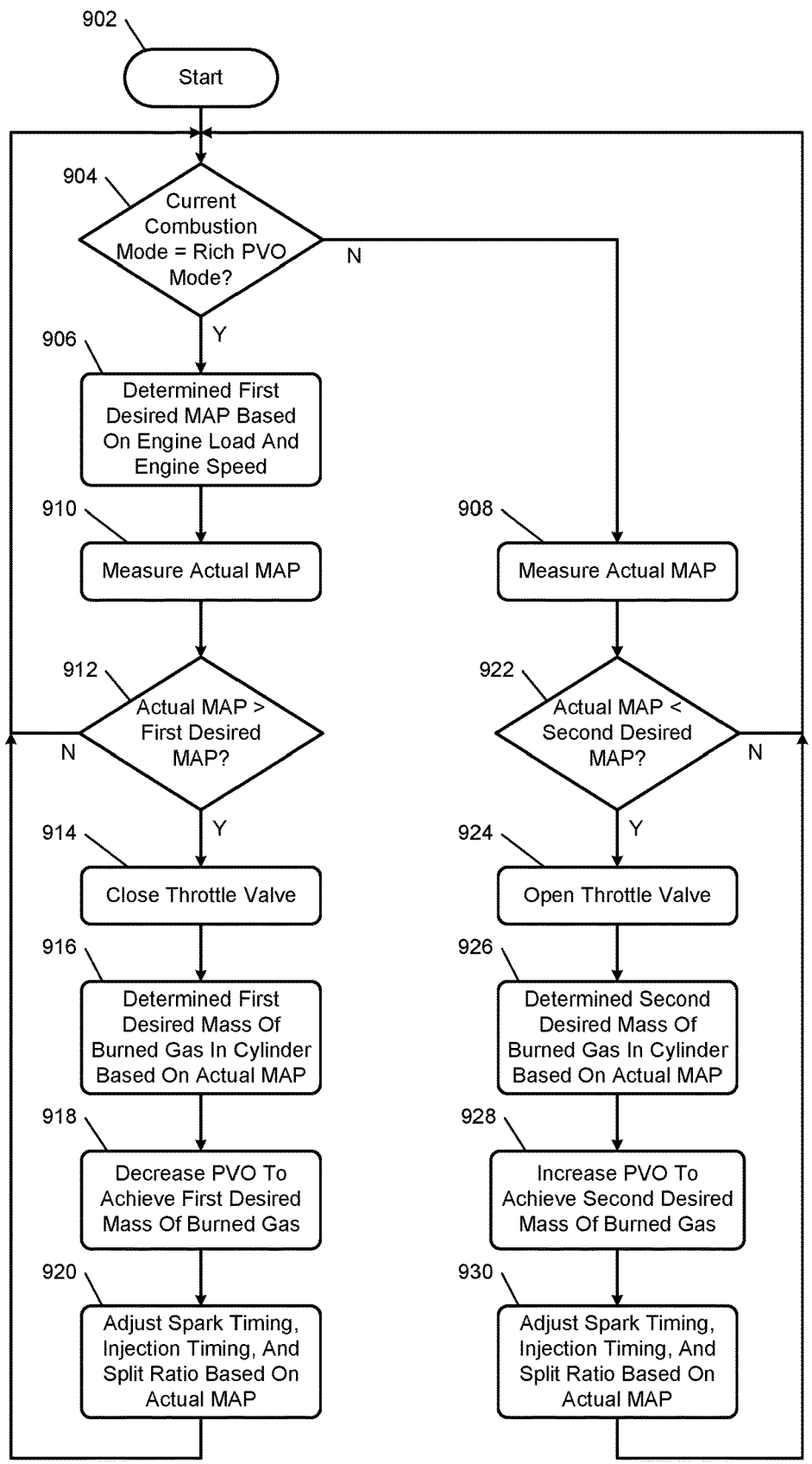
FIG. 9 is a flowchart illustrating a method of adjusting actuators of an engine to switch the A/F ratio of the engine between a lean A/F ratio and a rich A/F ratio while the engine is operating in the PVO mode according to the present disclosure.

Referring now to FIG. 9, a method of adjusting the actuators of the engine 102 to switch the A/F ratio of the engine 102 between a lean A/F ratio and a rich A/F ratio while the engine 102 is operating in the PVO mode begins at 902 when the engine 102 starts. The method of FIG. 9 may be performed in conjunction with the method of FIG. 3. The below description of the method of FIG. 9 indicates that one of modules or sensors of FIG. 2 performs each step of the method. However, the particular modules or sensors that perform the steps of the method may be different than the modules and sensors mentioned in the below description of the method. Additionally or alternatively, one or more steps of the method may be implemented apart from the modules and sensors of FIG. 2.

At 904, the A/F ratio control module 210 determines whether the current combustion mode is the rich PVO mode. If the current combustion mode is the rich PVO mode, the method continues at 906. Otherwise, the method continues at 908. At 906, the desired MAP module 204 determines a first desired MAP of the engine 102 based on the engine load and the engine speed using, for example, a function or a lookup table yielding values that are predetermined to maintain robust combustion.

At 910, the MAP sensor 176 measures the actual MAP of the engine 102. At 912, the throttle control module 212 determines whether the actual MAP of the engine 102 is greater than the first desired MAP of the engine 102. If the actual MAP is greater than the first desired MAP, the method continues at 914. Otherwise, the method returns to 904.

At 914, the throttle control module 212 gradually closes the throttle valve 112 to decrease the actual MAP to the first desired MAP. At 916, the valve control module 218 determines the first desired mass of burned gas in each cylinder of the engine 102 based on the actual MAP of the engine 102 using, for example, a function or a lookup table. At 918, the valve control module 218 adjusts the timing of the intake and exhaust valves of the engine 102 to decrease the amount of positive valve overlap in order to achieve the first desired mass of burned gas.

At 920, the fuel control module 214 adjusts the injection timing and fuel split ratio of each cylinder of the engine 102 based on the actual MAP, and the spark control module 216 adjusts the spark timing of each cylinder of the engine 102 based on the actual MAP. The fuel control module 214 may adjust the injection timing and the fuel split ratio based on the actual MAP using a function or a lookup table, and the spark control module 216 may adjust the spark timing based on the actual MAP using a function or a lookup table. The injection timing, the fuel split ratio, and the spark timing are adjusted to achieve robust combustion in the cylinders of the engine 102 when the actual MAP of the engine 102 is reduced while the engine 102 is operating in the rich PVO mode.

At 908, the MAP sensor 176 measures the actual MAP of the engine 102. At 922, the throttle control module 212 determines whether the actual MAP of the engine 102 is greater than a second desired MAP of the engine 102. If the actual MAP is greater than the second desired MAP, the method continues at 924. Otherwise, the method returns to 904. The second desired MAP may be greater than the first desired MAP and may be a predetermined pressure near ambient pressure such as pressure within a range from 98 kilopascals (kPa) to 99 kPa.

At 924, the throttle control module 212 gradually opens the throttle valve 112 to increase the actual MAP to the second desired MAP. At 926, the valve control module 218 determines a second desired mass of burned gas in each cylinder of the engine 102 based on the actual MAP of the engine 102 using, for example, a function or a lookup table. At 928, the valve control module 218 adjusts the timing of the intake and exhaust valves of the engine 102 to increase the amount of positive valve overlap in order to achieve the second desired mass of burned gas.

At 930, the fuel control module 214 adjusts the injection timing and fuel split ratio of each cylinder of the engine 102 based on the actual MAP, and the spark control module 216 adjusts the spark timing of each cylinder of the engine 102 based on the actual MAP. The fuel control module 214 may adjust the injection timing and the fuel split ratio based on the actual MAP using a function or a lookup table, and the spark control module 216 may adjust the spark timing based on the actual MAP using a function or a lookup table. The injection timing, the fuel split ratio, and the spark timing are adjusted to achieve robust combustion in the cylinders of the engine 102 when the actual MAP of the engine 102 is increased while the engine 102 is operating in the rich PVO mode.

Figures 10, 11:
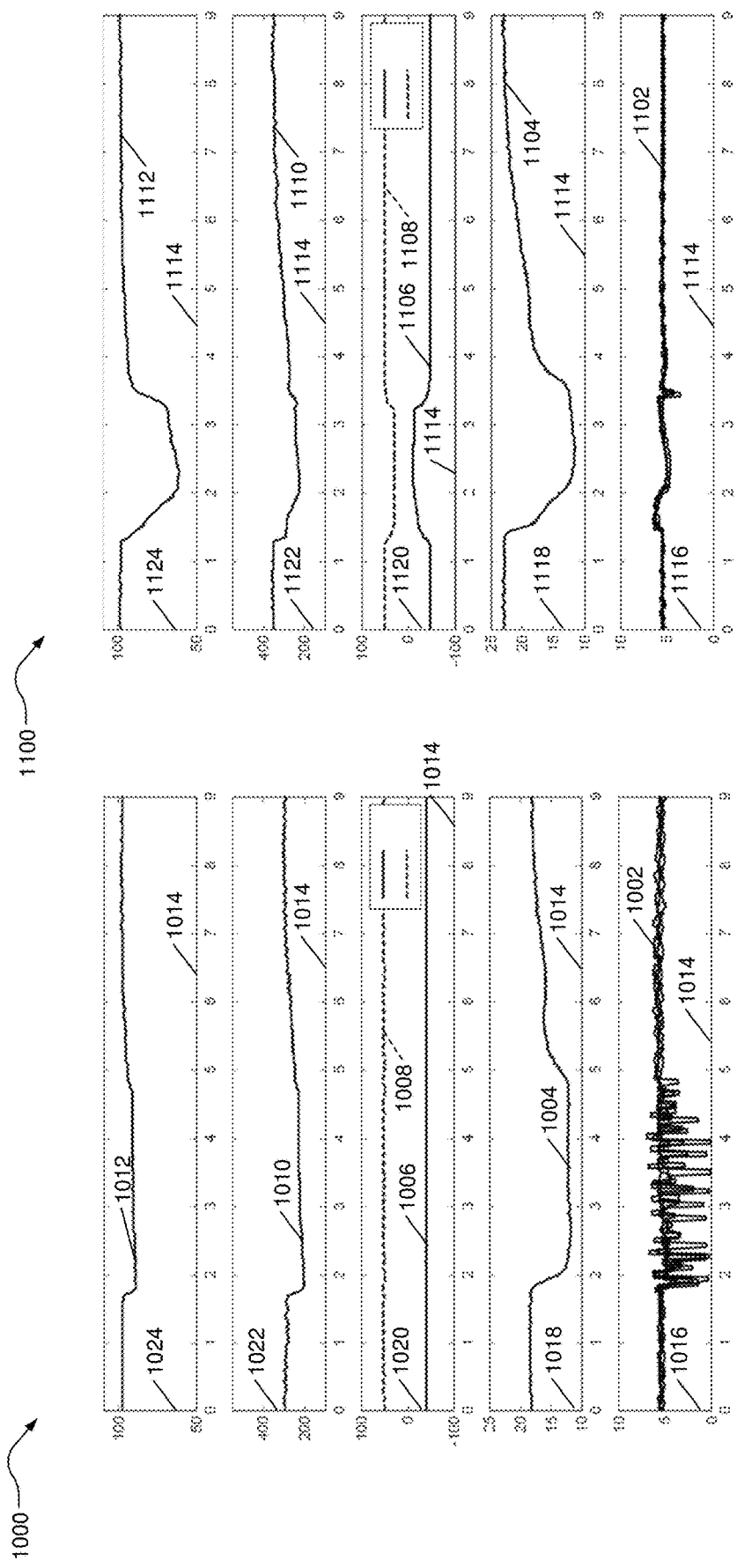
FIG. 10 is a graph illustrating engine operating conditions when a throttle of an engine is held open while the A/F ratio of the engine is adjusted to a rich A/F ratio as the engine is operating in the PVO mode according to the present disclosure.
FIG. 11 is a graph illustrating engine operating conditions when a throttle of an engine is closed while the A/F ratio of the engine is adjusted to a rich A/F ratio as the engine is operating in the PVO mode according to the present disclosure.

Referring now to FIGS. 10 and 11, graphs 1000 and 1100 illustrate now actuators of the engine 102 may be adjusted to maintain robust combustion when the A/F ratio of the engine 102 is adjusted to a rich A/F ratio while the engine 102 is operating in the PVO mode. More particularly, the graph 1000 of FIG. 10 illustrates operating conditions of the engine 102 when the timing of the intake and exhaust valves is held constant while the A/F ratio of the engine 102 is adjusted to a rich A/F ratio as the engine 102 is operating in the PVO mode. The graph 1100 of FIG. 11 illustrates operating conditions of the engine 102 when the timing of the intake and exhaust valves is coordinated with the throttle valve 112 while the A/F ratio of the engine 102 is adjusted to a rich A/F ratio as the engine 102 is operating in the PVO mode.

The engine operating conditions illustrated by the graph 1000 of FIG. 10 include an indicated mean effective brake pressure (IMEP) 1002 of the engine 102, the actual A/F ratio 1004 of the engine 102, the timing 1006 of the intake valves of the engine 102 (including the intake valve 122), the timing 1008 of the exhaust valves of the engine 102 (including the exhaust valve 130), the air mass 1010 delivered to each cylinder of the engine 102 (including the cylinder 118), and the actual MAP 1012 of the engine 102. Each operating condition is plotted with respect to an x-axis 1014 that represents time in seconds. In addition, the IMEP 1002 is plotted with respect to a y-axis 1016 that represents the pressure in bars, the actual A/F ratio 1004 is plotted with respect to a y-axis 1018 that represents A/F ratio, the intake and exhaust valve timing 1006 and 1008 are plotted with respect to a y-axis 1020 that represents valve timing in crank angle degrees, the air mass per cylinder 1010 is plotted with respect to a y-axis 1022 that represents mass in mg, and the actual MAP 1012 is plotted with respect to a y-axis 1024 that represents the pressure in kPa.

In the graph 1000 of FIG. 10, at a time just before 2 seconds, the actual A/F ratio 1004 of the engine 102 is adjusted from a lean A/F ratio of about 18:1 to a rich A/F ratio of about 12:1, and is held at that rich A/F ratio for about 3 seconds. During this enrichment period, the throttle valve 112 is closed, but the timing of the intake and exhaust valve timing 1006 and 1008 is held constant to yield a constant amount of positive valve overlap. As a result, combustion within the cylinders of the engine 102 becomes unstable due to excess amount of residual gas, as indicated by the fluctuations in the IMEP 1002 between a time of about 2 seconds and a time of about 5 seconds.

In the graph 1100 of FIG. 11, at a time of about 1.5 seconds, the actual A/F ratio 1104 of the engine 102 is adjusted from a lean A/F ratio of about 23:1 to a rich A/F ratio of about 12:1, and is held at that rich A/F ratio for about 2 seconds. During this enrichment period, the throttle valve 112 is gradually closed, and the intake and exhaust valve timing 1106 and 1108 are adjusted to reduce the amount of positive valve overlap. As a result, combustion within the cylinders of the engine 102 remains relatively robust, as indicated by the minimal fluctuations in the IMEP 1102 between a time of about 1.5 seconds and a time of about 3.5 seconds.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in a different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a combustion mode circuit configured to switch a combustion mode of a low-temperature combustion (LTC) engine between a spark ignition (SI) mode, a positive valve overlap (PVO) mode, and a negative valve overlap (NVO) mode;
a spark control circuit configured to control a spark plug to generate a spark in a cylinder of the LTC engine when the LTC engine is operating in the SI mode;
a valve control circuit configured to:
control intake and exhaust valves of the cylinder to yield a positive valve overlap when the LTC engine is operating in the PVO mode; and
control the intake and exhaust valves of the cylinder to yield a negative valve overlap when the LTC engine is operating in the NVO mode; and
an air/fuel (A/F) ratio control circuit configured to adjust a desired A/F ratio of the LTC engine to a rich A/F ratio when the combustion mode of the LTC engine is switched to the PVO mode from either one of the SI mode and the NVO mode.

2. The system of claim 1 wherein the A/F ratio control circuit is configured to adjust the desired A/F ratio of the LTC engine from the rich A/F ratio to a lean A/F ratio when the LTC engine is operating in the PVO mode and the desired A/F ratio of the LTC engine has been adjusted to the rich A/F ratio for a first period.

3. The system of claim 2 wherein the A/F ratio control circuit is configured to determine the first period based on a storage level of ammonia in a selective catalytic reduction (SCR) catalyst in an exhaust system of the LTC engine.

4. The system of claim 2 wherein the A/F ratio control circuit is configured to adjust the desired A/F ratio of the LTC engine from the lean A/F ratio to the rich A/F ratio when the LTC engine is operating in the PVO mode and a period that has elapsed since the desired A/F ratio of the LTC engine was last switched to the rich A/F ratio is greater than an inverse of a first frequency.

5. The system of claim 4 wherein the A/F ratio control circuit is configured to determine the first frequency based on a storage level of ammonia in a SCR catalyst in an exhaust system of the LTC engine.

6. The system of claim 1 wherein the combustion mode circuit is configured to switch the combustion mode of the LTC engine between the SI mode, the PVO mode, and the NVO mode based on a speed of the LTC engine and a load on the LTC engine.

7. The system of claim 1 wherein the A/F ratio control circuit is configured to adjust the desired A/F ratio of the LTC engine to a stoichiometric A/F ratio when the LTC engine is operating in the SI mode.

8. The system of claim 1 wherein when the LTC engine is operating in the PVO mode or the NVO mode, the LTC engine is configured to combust an A/F mixture within the cylinder using at least one of homogeneous charge compression ignition, premixed charge compression ignition, and reactivity controlled compression ignition.

9. The system of claim 1 further comprising:
a desired manifold absolute pressure (MAP) circuit configured to determine a first desired MAP when the LTC engine is operating in the PVO mode and the desired A/F ratio of the LTC engine is adjusted to the rich A/F ratio; and
a throttle control circuit configured to decrease an opening area of a throttle valve of the LTC engine when the LTC engine is operating in the PVO mode, the desired A/F ratio of the LTC engine is adjusted to the rich A/F ratio, and an actual MAP of the LTC engine is greater than the first desired MAP.

10. The system of claim 9 wherein the throttle control circuit is configured to stop decreasing the opening area of the throttle valve when the actual MAP of the LTC engine is less than or equal to the first desired MAP.

11. The system of claim 9 wherein the desired MAP circuit is configured to determine the first desired MAP based on a speed of the LTC engine and a load on the LTC engine.

12. The system of claim 9 wherein the valve control circuit is configured to:

determine a desired mass of burned gas in the cylinder based on the actual MAP when the LTC engine is operating in the PVO mode and the desired A/F ratio of the LTC engine is adjusted to the rich A/F ratio; and control the intake and exhaust valves of the cylinder to decrease an amount of the positive valve overlap in order to decrease an actual mass of burned gas in the cylinder to the desired mass of burned gas in the cylinder.

13. The system of claim 9 further comprising a fuel control circuit configured to adjust a fuel injection timing of the cylinder and a fuel split ratio of the cylinder based on the actual MAP of the LTC engine when the LTC engine is operating in the PVO mode and the desired A/F ratio of the LTC engine is adjusted to the rich A/F ratio, wherein the fuel split ratio is a ratio between a mass of a pilot fuel injection during an engine cycle and a total mass of all fuel injections during the engine cycle.

14. The system of claim 9 wherein the spark control circuit is configured to adjust a spark timing of the cylinder based on the actual MAP of the LTC engine when the LTC engine is operating in the PVO mode and the desired A/F ratio of the LTC engine is adjusted to the rich A/F ratio.

15. The system of claim 9 wherein the throttle control circuit is configured to increase the opening area of the throttle valve when the LTC engine is operating in the PVO mode, the desired A/F ratio of the LTC engine is adjusted to a lean A/F ratio, and the actual MAP of the LTC engine is less than a second desired MAP.

16. The system of claim 15 wherein the throttle control circuit is configured to stop increasing the opening area of the throttle valve when the actual MAP of the LTC engine is greater than or equal to the second desired MAP.

17. The system of claim 15 wherein the valve control circuit is configured to:

determine a desired mass of burned gas in the cylinder based on the actual MAP when the LTC engine is operating in the PVO mode and the desired A/F ratio of the LTC engine is adjusted to the lean A/F ratio; and control the intake and exhaust valves of the cylinder to increase an amount of the positive valve overlap in order to increase an actual mass of burned gas in the cylinder to the desired mass of burned gas in the cylinder.

18. A system comprising:

a combustion mode circuit configured to switch a combustion mode of a low-temperature combustion (LTC) engine between a spark ignition (SI) mode, a positive valve overlap (PVO) mode, and a negative valve overlap (NVO) mode;

a spark control circuit configured to control a spark plug to generate a spark in a cylinder of the LTC engine when the LTC engine is operating in the SI mode;

a valve control circuit configured to:
control intake and exhaust valves of the cylinder to yield a positive valve overlap when the LTC engine is operating in the PVO mode; and
control the intake and exhaust valves of the cylinder to yield a negative valve overlap when the LTC engine is operating in the NVO mode; and an air/fuel (A/F) ratio control circuit configured to:
adjust a desired A/F ratio of the LTC engine to a stoichiometric A/F ratio when the LTC engine is operating in the SI mode;
adjust the desired A/F ratio of the LTC engine to a lean A/F ratio when the LTC engine is operating in the NVO mode; and
adjust the desired A/F ratio of the LTC engine to a rich A/F ratio when the LTC engine is operating in the PVO mode.

19. The system of claim 18 wherein the A/F ratio control circuit is configured to adjust the desired A/F ratio to the rich A/F ratio when the combustion mode of the LTC engine is switched to the PVO mode from either one of the SI mode and the NVO mode.

20. The system of claim 19 wherein the A/F ratio control circuit is configured to adjust the desired A/F ratio of the LTC engine from the rich A/F ratio to the lean A/F ratio when the LTC engine is operating in the PVO mode and the desired A/F ratio of the LTC engine has been adjusted to the rich A/F ratio for a threshold period.

* * * * *